United States Patent [19]

Brandenburg

[11] Patent Number: 4,679,906

[45] Date of Patent: Jul. 14, 1987

[54] ANTI-GLARE REAR VIEW MIRROR

[75] Inventor: Darrell L. Brandenburg, Anderson, Ind.

[73] Assignee: General Motors Corporation, Detroit, Mich.

[21] Appl. No.: 808,727

[22] Filed: Dec. 13, 1985

[51] Int. Cl.4 .............................................. B60R 1/04
[52] U.S. Cl. .................................................... 350/281
[58] Field of Search ......................................... 350/281

[56] References Cited

U.S. PATENT DOCUMENTS

| | | |
|---|---|---|
| 2,913,958 | 11/1959 | Mead et al. .......................... 350/281 |
| 3,507,562 | 4/1970 | Yamashita et al. . |
| 3,561,848 | 2/1971 | Cunningham . |
| 3,586,422 | 6/1971 | Kagami et al. ....................... 350/281 |
| 4,319,806 | 3/1982 | Brandenburg . |

FOREIGN PATENT DOCUMENTS

| | | |
|---|---|---|
| 1237454 | 5/1967 | Fed. Rep. of Germany . |
| 8319673 | 12/1983 | Fed. Rep. of Germany . |
| 1227736 | 4/1971 | United Kingdom . |

*Primary Examiner*—John K. Corbin
*Assistant Examiner*—Rebecca D. Gass
*Attorney, Agent, or Firm*—Edward J. Biskup

[57] ABSTRACT

An anti-glare rear view mirror which includes a plastic housing combined with a plastic pivot plate having laterally extending pivot shafts received in a snap action manner by a pair of bearing members integrally formed with the housing and wherein the pivot plate is combined with a plastic finger operated actuator and a metal spring in a manner so as to allow the housing together with a supported prismoidal mirror to be selectively moved between a "day" position and a "night" position upon 90 degrees rotation of the actuator.

4 Claims, 5 Drawing Figures

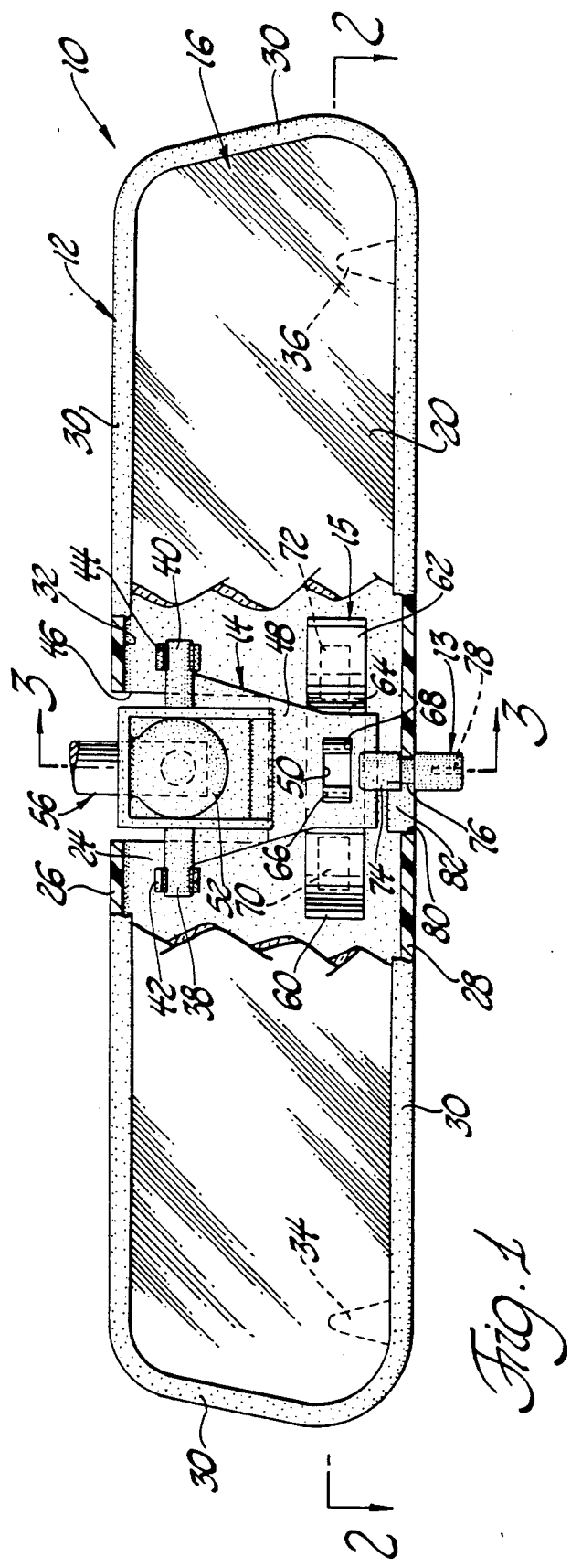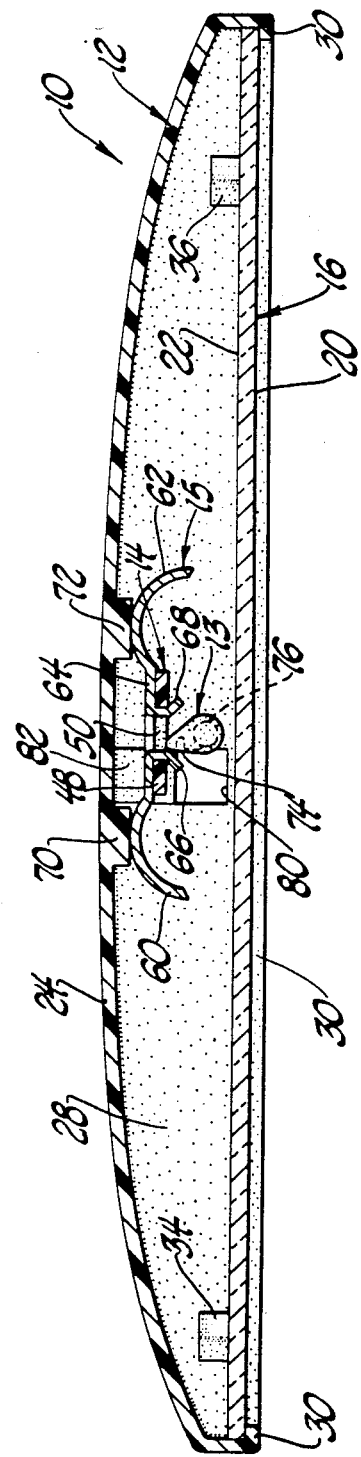

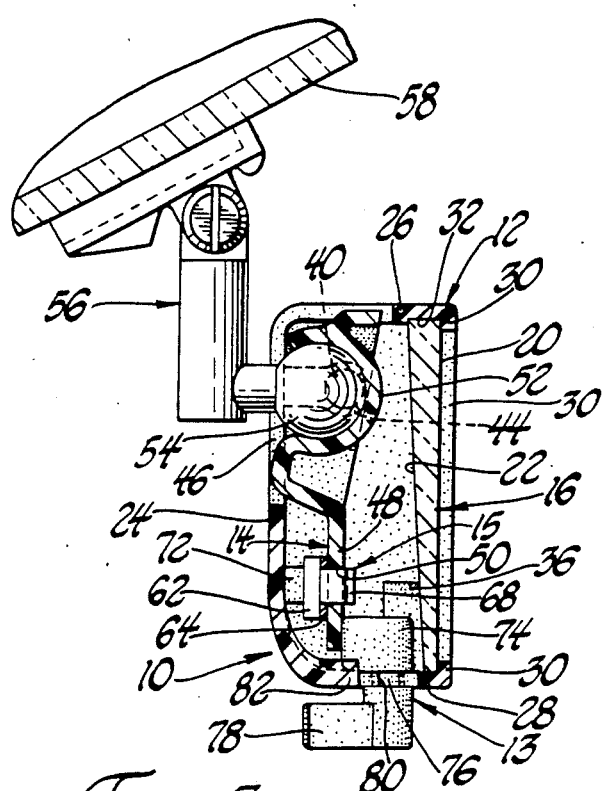
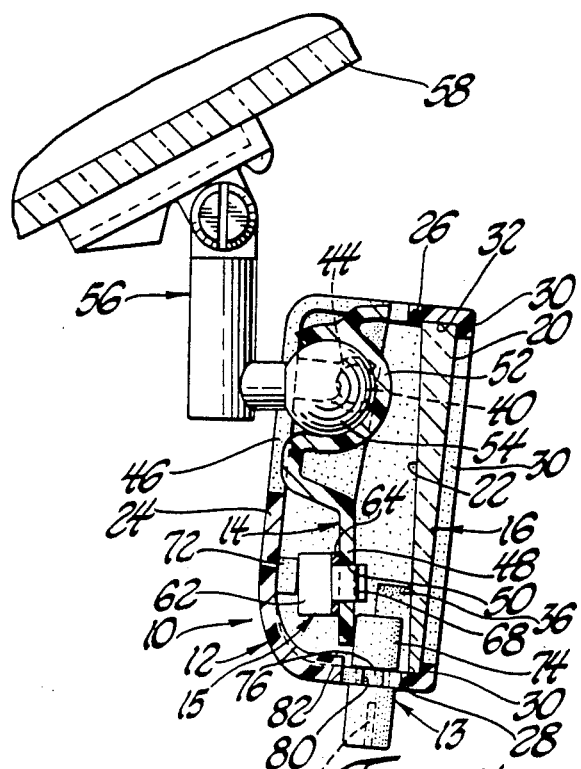
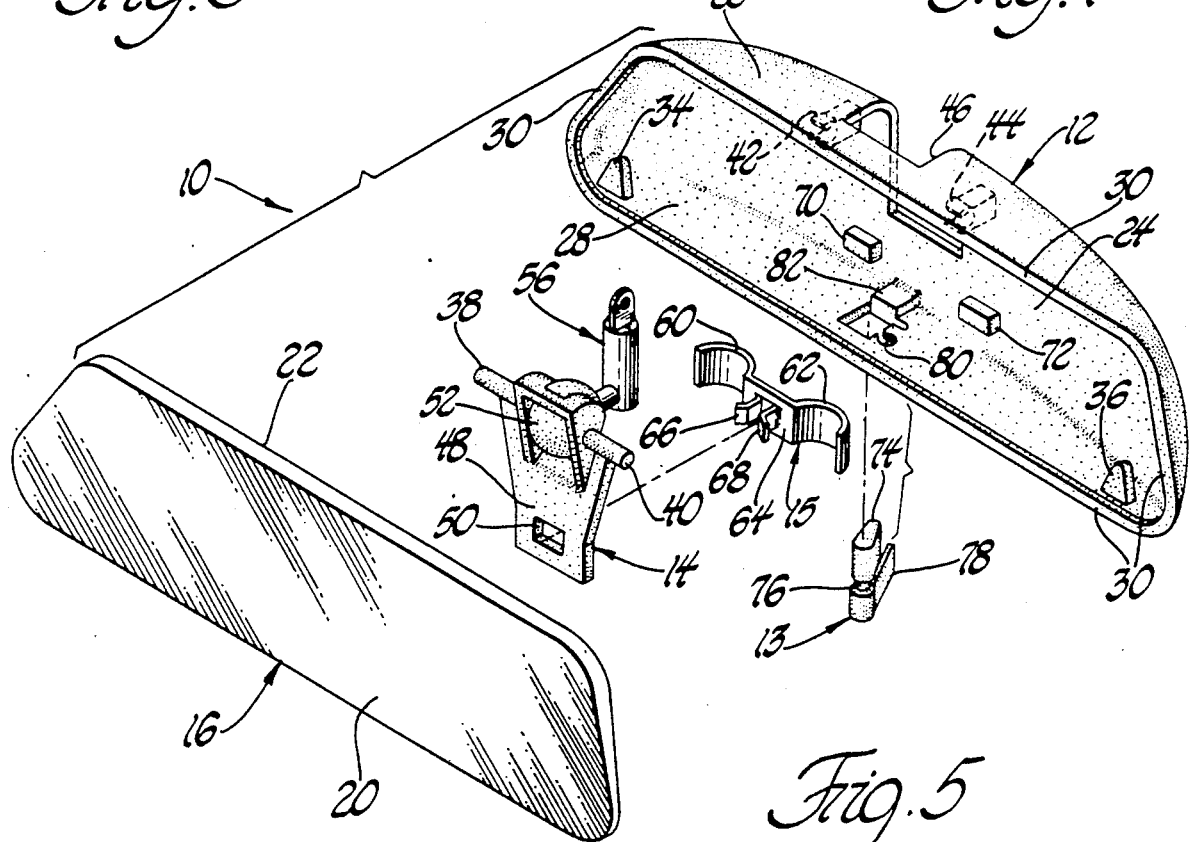
Fig. 3
Fig. 4
Fig. 5

ANTI-GLARE REAR VIEW MIRROR

This invention concerns an anti-glare rear view mirror of the type which includes a tiltable prismoidal mirror element having two reflecting surfaces of different reflecting powers that are selectively tilted to present one or the other for viewing:

More specifically, the anti-glare rear view mirror according to the present invention includes a housing which has the prismoidal mirror element mounted therein and has a back wall integrally formed with forwardly projecting top and bottom walls, the latter of which has an opening formed therein for rotatably supporting an actuator. The back wall of the housing is also formed with an opening through which one end of a support extends into the interior of the housing for connection with a pivot plate member. The pivot plate member has a body portion made of plastic material that has laterally outwardly extending pivot members formed at the upper end thereof that are located within bearing members formed on opposite sides of the aforementioned back wall opening for allowing the housing to pivot about a horizontal axis relative to the pivot plate member. The lower end of the pivot plate member supports a spring member that engages the back wall of the housing so as to bias a cam member formed on the actuator into engagement with the lower end of the pivot plate member. A finger tab member is rigidly connected to the cam member and extends through the opening formed in the bottom wall for manual rotative movement between first and second positions. The arrangement of the aforementioned parts is such that when the finger tab member is rotated 90 degrees between the first and second positions, the cam member is repositioned relative to the pivot plate member with resultant pivotal movement of the housing so as to present one or the other of the reflecting surfaces to the viewer.

The objects of the present invention are to provide a new and improved anti-glare rear view mirror having two reflecting surfaces and in which a minimum of parts are required most of which are made from a plastic material and are snapped together to provide an operable mechanism; to provide a new and improved anti-glare rear view mirror which includes a plastic housing combined with a plastic pivot plate member having laterally extending pivot shafts received in a snap action manner by a pair of bearing members integrally formed on the housing and wherein the pivot plate member is combined with a finger operated actuator and a metal spring in a manner so as to allow the housing together with a supporting prismoidal mirror element to be selectively moved between a "day" position and a "night" position; and to provide a new and improved anti-glare rear view mirror which is primarily composed of plastic parts and a glass prismoidal mirror all of which can be assembled together without requiring any separate fastener members.

Other objects and advantages of the present invention will be apparent upon reading the following detailed description when taken with the accompanying drawings in which:

FIG. 1 is a front elevational view of an anti-glare rear view mirror made in accordance with the present invention;

FIG. 2 is a cross-sectional view of the anti-glare rear view mirror taken on line 2—2 of FIG. 1;

FIG. 3 is a sectional view of the anti-glare rear view mirror taken on line 3—3 of FIG. 1 and shows the mirror in the "night" viewing position;

FIG. 4 is a view similar to FIG. 3 but shows the mirror in the "day" viewing position; and FIG. 5 is an exploded view in perspective showing the various parts of the anti-glare rear view mirror.

Referring now to the drawings and particularly FIGS. 1 and 2 thereof, an anti-glare rear view mirror 10 is shown having a housing 12, an actuator 13, a pivot plate member 14 and a mirror element 16. The anti-glare rear view mirror 10 provides an arrangement wherein the housing 12 and accordingly the mirror element 16 is selectively pivoted between two viewing positions, namely a "day" position which is used under conditions of normal visibility, and a "night" position which is used to provide a rearward image of reduced intensity such as is desired to reduce the headlight glare from a following vehicle.

The mirror element 16 constitutes a conventional prismoidal mirror that is generally wedge shaped when viewed in transverse cross-section. More specifically, the mirror element 16 includes upwardly diverging front and rear reflecting surfaces which are respectively identified by the reference numerals 20 and 22. The rear reflecting surface 22 is provided with a reflective coating formed by any suitable process such as aluminizing. Thus with this construction, different reflecting powers are provided by the front reflecting surface 20 and the rear reflecting surface 22. Preferably, the front reflecting surface 20 has an approximate 4 percent reflectivity while the rear reflecting surface 22 has approximately a 90 percent reflectivity. Therefore, by manually selectively positioning the mirror element 16, the operator of a vehicle can present for viewing the reflecting surface best suited to his immediate driving requirements.

As best seen in FIGS. 1, 2 and 3, the housing 12 is molded as a single piece from a plastic material and generally comprises a vertically oriented back wall 24 which is integral with a forwardly projecting top wall 26 and a parallel forwardly projecting bottom wall 28 each of which terminates with an inwardly turned rim 30 formed therealong as well as along the sides of the housing 12. The back wall 24, top and bottom walls 26 and 28, and the rims 30 define a chamber which receives the pivot plate member 14, the spring member 15 and the upper end of the actuator 13. As seen in FIG. 3, a groove is formed in the top wall 26 and together with the rim 30 defines a channel 32 which extends the length of the top wall 26 and is slightly smaller in width than the upper peripheral configuration of the mirror element 18. A pair of stop members 34 and 36 integral with the bottom wall 28 are provided and are spaced rearwardly from the associated rim 30, a distance slightly less than the thickness of the lower peripheral portion of the mirror element 16. Thus, in assembly the lower edge of the mirror element 16 is positioned behind the rim 30 of the bottom wall 28 against the stop members 34 and 36 and the upper edge of the mirror element 16 is then snapped or pressed into the channel 32 and thereby securely held within the housing 12. This latter assembly operation is accomplished after the mirror housing is first heated to a temperature in the range of 85 degrees C. to 100 degrees C.

The pivot plate member 14 is also molded as a single piece from a plastic material and as seen in FIGS. 1 and 5 has a pair of integral laterally outwardly extending and horizontally aligned cylindrical pivot shafts 38 and 40 which snap into and are respectively received by a pair of bearing members 42 and 44 projecting outwardly from and integrally formed with the back wall 24 on opposite sides of an L-shaped opening 46 formed in the back and top walls 24 and 26 as seen in FIG. 3. The pivot plate member 14 also includes an integral base plate portion 48 the lower end of which has a rectangular opening 50 centrally formed therein. The upper end of the pivot plate member 14 is provided with a spherical socket 52 which receives spherical head 54 of a ball support 56 that extends through the opening 46 in the back and top walls and is adapted to be secured to a windshield 58 of an automobile in the manner as shown in FIGS. 3 and 4. The pivot plate member 14 and the attached mirror housing 12 are adjustable in position about the spherical head 54 in the usual manner for providing the desired rear view to the vehicle operator.

The spring member 15 is a stamping made from spring steel and includes a pair of bow sections 60 and 62 integral with a central section 64 having a pair of forwardly extending ears 66 and 68. The ears 66 and 68, when pressed together, are adapted to extend through the opening 50 in the base plate portion 48 of the pivot plate member 14 to be retained thereby. The base plate portion 48 carries the spring member 15 with the bow sections 60 and 62 located along a horizontal axis. The bow sections 60 and 62 are adapted to respectively contact a pair of pads 70 and 72 integral with the back wall 24 of the housing 12 adjacent the bottom wall 28.

The actuator 13 is also made of a plastic material and has the upper end thereof formed as a cam member 74 which, as seen in FIG. 2, is tear-drop shaped in plan view. The cam member 74 is connected to an integrally formed cylindrical midsection 76 of a reduced diameter which in turn is integrally formed with a finger tap member 78. The midsection 76 of the actuator 13 is snapped into a keyhole shaped opening 80 formed in the bottom wall 28 of the housing 12 so as to locate the cam member 74 in continuous engagement with the lower end of the base plate portion 48 of the pivot plate member 14 as seen in FIGS. 2, 3 and 4. It should be apparent that the spring member 15 serves to bias the lower portion of the housing 12 rearwardly (or to the left as seen in FIG. 3) so as to cause the cam member 74 of the actuator 13 to be in continuous contact with the lower end of the base plate portion 48 when the various parts of the anti-glare rear view mirror 10 are assembled as shown in FIGS. 1 through 4. In this regard, and when the actuator 13 is located in the position shown in FIG. 4, the mirror 10 is in the normal "day" position to present the rear reflecting surface 22 to the viewer. During this time, the actuator 13 is located with the finger tab member 78 thereof extending substantially parallel to the rim 30 associated with the top and bottom walls 26 and 28. In this position of the actuator 13 the low lobe portion of the cam member 74 engages the lower end of the base plate portion 48 of the pivot plate member 14. When it is desired to move the rearview mirror to the "night" viewing position so as to present the front reflecting surface 20 to the viewer, the finger tab is rotated, as seen in FIG. 2, counterclockwise approximately 95 degrees from the dotted line so as to cause the high end or lobe of the cam member 74 to rotate from the position of FIG. 4 to the full line position of FIGS. 2 and 3 wherein the high lobe contacts a stop member 82 integral with base wall 28 and at the same time engages the lower end of the pivot plate portion 48 to further compress the bow sections 60 and 62 of the spring member 15. This movement causes the housing 12 together with the mirror element 16 to pivot about a horizontal axis passing through the longitudinal centers of the horizontally aligned pivot shaft members 38 and 40 within the bearing member so as to position the mirror element 16 with its front reflecting surface 20 presented to the operator for rearward viewing. In the FIG. 2 position of the high lobe, the latter is "over center" so as to maintain the housing 12 in the "night" position.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. An anti-glare rear view mirror adapted to be mounted on a windshield, said mirror comprising a housing supporting a mirror element having two reflecting surfaces of different reflecting powers, said housing including a back wall integrally formed with forwardly extending top and bottom walls so as to define a chamber with said back wall, said back wall having an opening formed therein, a pair of bearing members projecting outwardly from said back wall into said chamber and located on opposite sides of said back wall opening adjacent said top wall, a keyhole shaped opening formed in said bottom wall, a pair of pad members formed on said back wall in said chamber adjacent said bottom wall, a pivot plate member located in said chamber and having a ball support mounted therein at the upper end thereof for connection with said windshield through said opening formed in said back wall, said pivot plate member including a pair of laterally extending cylindrical pivot shaft members respectively snapped into and received within said pair of bearing members, a spring member carried by the lower end of said pivot plate member for engaging said pad members, and an actuator member located in said keyhole shaped opening for rotation about a vertical axis and having a cam member engaging said lower end of said pivot plate member against the continuous bias of said spring member so as to selectively present one or the other of said reflecting surfaces to a viewer.

2. An anti-glare rear view mirror adapted to be mounted on a windshield, said mirror comprising a housing supporting a mirror element having two reflecting surfaces of different reflecting powers, said housing including a back wall integrally formed with forwardly extending top and bottom walls so as to define a chamber, said back wall having an opening formed therein, a pair of horizontally aligned bearing members projecting outwardly from said back wall into said chamber and located on opposite sides of said opening in said back wall adjacent said top wall, a keyhole shaped opening formed in said bottom wall, a pair of pad members formed on said back wall in said chamber adjacent said bottom wall, a pivot plate member located in said chamber and having a ball support mounted therein at the upper end thereof for connection with said windshield through said opening formed in said back wall, said pivot plate member including a pair of laterally outwardly extending and axially aligned cylindrical pivot shaft members respectively snapped into and received within said pair of bearing members, a spring member carried by the lower end of said pivot plate member and having a pair of bow sections engaging said pad members, and an actuator member located in said keyhole shaped opening for rotation about a vertical axis and having a cam member engaging said lower end of said pivot plate member against the continuous bias of said spring member so as to selectively present one or the other of said reflecting surfaces to a viewer.

3. An anti-glare rear view mirror adapted to be mounted on a windshield, said mirror comprising a housing supporting a mirror element having two reflecting surfaces of different reflecting powers, said housing including a back wall integrally formed with forwardly extending top and bottom walls so as to define a chamber, said top wall and said back wall having an L-shaped opening formed therein, a pair of horizontally aligned bearing members projecting outwardly from said back wall into said chamber and located on opposite sides of said opening in said back wall adjacent said top wall, a keyhole shaped opening formed in said bottom wall, a pair of pad members formed on said back wall in said chamber adjacent said bottom wall vertically below said pair of bearing members, a pivot plate member located in said chamber and having a socket supporting ball support therein at the upper end thereof for connection with said windshield through said opening formed in said back wall, said pivot plate member including a pair of laterally extending cylindrical pivot shaft members respectively snapped into and received within said pair of bearing members, a spring member comprising a pair of bow sections formed with a midsection having a pair of ears, said spring member connected to said lower end of said pivot plate member by said pair of ears and having said bow sections engaging said pad members, and an actuator member located in said keyhole shaped opening for rotation about a vertical axis and having a cam member engaging the lower end of said pivot plate member against the continuous bias of said spring member so as to selectively present one or the other of said reflecting surfaces to a viewer.

4. The anti-glare rear view mirror of claim 3 wherein said actuator member is rotatable approximately 93 degrees at which time the high lobe of the cam member contacts a stop member formed on said housing.

* * * * *